United States Patent
Baader et al.

(10) Patent No.: US 7,337,165 B2
(45) Date of Patent: Feb. 26, 2008

(54) METHOD AND SYSTEM FOR PROCESSING A TEXT SEARCH QUERY IN A COLLECTION OF DOCUMENTS

(75) Inventors: Andrea Baader, Boeblingen (DE); Jochen Doerre, Boeblingen (DE); Monika Matschke, Calw (DE); Andreas Neumann, Muelheim an der Ruhr (DE); Roland Seiffert, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 10/995,638

(22) Filed: Nov. 22, 2004

(65) Prior Publication Data
US 2005/0144159 A1 Jun. 30, 2005

(30) Foreign Application Priority Data
Dec. 29, 2003 (EP) .................................. 03104989

(51) Int. Cl.
*G06F 7/00* (2006.01)
*G06F 17/00* (2006.01)
(52) U.S. Cl. ........................... 707/3; 707/101; 707/102
(58) Field of Classification Search .................... 707/3, 707/101, 102
See application file for complete search history.

(56) References Cited

U.S. PATENT DOCUMENTS

| 5,845,278 | A | * | 12/1998 | Kirsch et al. | 707/3 |
| 6,216,123 | B1 | * | 4/2001 | Robertson et al. | 707/3 |
| 2002/0023077 | A1 | * | 2/2002 | Nguyen et al. | 707/1 |
| 2002/0073068 | A1 | * | 6/2002 | Guha | 707/1 |
| 2003/0078913 | A1 | * | 4/2003 | McGreevy | 707/3 |

* cited by examiner

*Primary Examiner*—Christian Chace
*Assistant Examiner*—Kabir Jahangir
(74) *Attorney, Agent, or Firm*—Mollborn Patents; Fredrik Mollborn

(57) ABSTRACT

A method, system and computer program product implementing the method are provided to process a text search query in a collection of documents. A full posting index is generated for the documents in the collection. The full posting index comprises one or more first index terms and a full posting list for each first index term, enumerating the occurrences of the first index term in the documents. In addition to the full posting index, at least one additional posting index is generated for the documents. The additional posting index is related to a defined document part and comprises one or more second index terms and a restricted posting list for each second index term, enumerating all occurrences of the second index term in the document part of the documents of the collection. The text search query is performed using the additional posting index.

7 Claims, 4 Drawing Sheets

```
doc1      a b c b d                              ⎫
doc2      b c c d                                ⎬ 100
doc3      a c d d                                ⎭ a         doc1:1 doc3:1                          ⎫
b         doc1:2,4 doc2:1                        ⎬ 200
c         doc1:3 doc2:2,3 doc3:2                 ⎪
d         doc1:5 doc2:4 doc3:3,4                 ⎭ title     doc1:1-2 doc2:1-1 doc3:1-1             ⎫
body      doc1:3-5 doc2:2-4 doc3:2-4             ⎬ 300
high-                                            ⎪
lighted   doc1:2-2,4-4 doc2:1-1,3-4              ⎪
          doc3:1-2                               ⎭
```

Prior Art

Fig. 1

```
a@title      doc1:1 doc3:1                    ⎫
b@title      doc1:2 doc2:1                    ⎬ 400
c@title                                       ⎥
d@title                                       ⎭ a@body                                        ⎫
b@body       doc1:4                           ⎬ 500
c@body       doc1:3 doc2:2,3 doc3:2           ⎥
d@body       doc1:5 doc2:4 doc3:3,4           ⎭ a@highl.                                      ⎫
b@highl.     doc1:2,4 doc2:1                  ⎬ 600
c@highl.     doc2:3 doc3:2                    ⎥
d@highl.     doc2:4                           ⎭
```

Fig. 2

METHOD AND SYSTEM FOR PROCESSING A TEXT SEARCH QUERY IN A COLLECTION OF DOCUMENTS

CROSS-REFERENCE TO RELATED APPLICATIONS

This patent application claims benefit under 35 USC § 119 (e) to Application no. 03104989.3, filed in the European Patent Office on Dec. 29, 2003 by International Business Machines Corporation titled "Method and Infrastructure for Processing a Text Search Query in a Collection of Documents" which is hereby incorporated herein by reference in its entirety.

BACKGROUND OF THE INVENTION

1. Field of the Invention

The present invention relates to a method, system and computer program product implementing the method, for processing text search queries in a collection of documents. In particular, the present invention relates to a method, system and computer program product, for processing text search queries which are restricted to a defined document part, for example, to a field such as the title or abstract of a document.

2. Description of the Related Art

The purpose of a text search query is typically to find those documents in a collection of documents that fulfill certain criteria, called search conditions, such as those documents which contain certain words. In many cases, the "relevance" of documents fulfilling the given search conditions has to be calculated as well. Most often, users are only interested in seeing the "best" documents which result from a text search query. Because the size of document collections to be searched is constantly increasing, the efficiency of text search query processing becomes an ever more important issue.

Text search query processing for a fulltext search is typically based on "inverted indexes". To generate inverted indexes for a collection of documents, all documents are analyzed to identify the occurring words or search terms as index terms together with their positions in the documents. In an "inversion step," this information is basically sorted so that the index term becomes the first order criteria. The result is stored in a full posting index comprising basically two parts. The first part, also called the dictionary, is a data structure for fast lookup of all index terms that have been encountered during indexing whereas the second part stores all occurrence information as a pool of full posting lists. Each dictionary entry, that is, each index term, contains a reference to a full posting list enumerating all occurrences of the index term in all documents of the collection. Typically, the posting lists are coded and compressed for storing.

FIG. 1 illustrates an example of a collection of documents 100 and a corresponding full posting index 200. The collection of documents 100 comprises three text documents doc1, doc2 and doc3. Each of these documents is a sequence of index terms a, b, c and d. For example, doc1 can be expressed as the following XML-fragment:

```
<document>
<title>
a<bold>b</bold>
<title>
```

```
<body>
c<bold>b</bold>d
<body>
<document>
```

The index terms a, b, c and d form a dictionary, that is, the set of index terms which the full posting index 200 is based on. It comprises a full posting list for each index term a, b, c and d, enumerating all occurrences of the corresponding index term in all documents doc1, doc2 and doc3 of the collection. In this example the occurrences of an index term are grouped by document.

For example, the full posting index 200 can be used to process the following query: "find all documents containing the phrase 'a b'". Thus, the search engine looks up all positions for "a" and all positions for "b". Then, the conditions whether "a" and "b" occur in the same document and whether "b" occurs in the position immediately after "a" are checked.

An important feature of text search engines is the ability to restrict searches to certain document parts, for example, fields, such as the title, abstract, body, etc., which are known at indexing time. A field of a document is conceptually viewed as a subset of the positions of the words in a document. Thus, it is possible to define continuous as well as discontinuous fields, for example, the "field" of all highlighted words or the "field" of all figure captions, and also overlapping fields, for example, all highlighted words in the title field. The fraction of all positions that are inside a given field, in all documents of a given collection is called the coverage of the field in the collection of documents.

In order to process queries comprising field restrictions, information about the extent of each field has to be added to the index. It is state of the art to use special posting lists for fields stored in a field posting index. Such a field posting index comprises a set of fields and a field posting list for each field of the set, enumerating the start and end positions of the continuous parts of the field in all documents of the collection.

In the example of FIG. 1 each document of the collection 100 starts with a "title" field, marked by underline, whereas the remainder is defined as "body" field. A third field is defined as "highlighted" and contains all highlighted, that is, bold face, words of the corresponding document.

Consequently, the corresponding field posting index 300 comprises the dictionary entries "title", "body" and "highlighted" and the corresponding field posting lists enumerate the start and end positions of the continuous parts of each field in all documents of the collection. In this example, the occurrences of a field are grouped by document.

This field posting index 300 can be used to process queries comprising a field restriction, such as, "find all documents containing the phrase 'a b' in the title field". Typically, this is done by first searching for candidates fulfilling the unrestricted query. In this example, one match is found in doc1 from position 1 to position 2. Only then, the search engine checks the positions of the match against the positions stored in the field posting index 300, namely in the field posting list of the field "title". In this example, the match is contained in the title extent of doc1, hence yielding one hit for the complete query.

The example described above illustrates a general technique to process a query comprising field restrictions. In a first step the corresponding non-restricted query is processed using the full posting index. Then, some form of additional filtering is applied on the result set of the non-restricted query using the field posting index. This additional checking of field restrictions leads to an overall query runtime exceeding the query runtime of the corresponding non-restricted query. In other words, searching entire documents is often faster than searching on defined document parts. This is contrary to the user's expectation that a query on small parts of documents should perform better than a query on entire documents.

SUMMARY OF THE INVENTION

Starting from this, an object of the present invention is to improve the efficiency of processing text search queries which are restricted to defined document parts.

The foregoing object is achieved by a method, system and computer program product as set forth in the independent claims. Further advantageous embodiments of the present invention are described in the dependent claims and are taught in the following description.

According to an embodiment of the present invention, a method is provided for processing text search queries in a collection of documents. A full posting index is generated. The full posting index comprises one or more first index terms and a full posting list for each first index term. The full posting list enumerates all occurrences of the one or more first index terms in the documents of the collection. In addition to the full posting index, at least one additional posting index is generated. The additional posting index is related to a defined document part and comprises one or more second index terms and a restricted posting list for each second index term. The restricted posting list enumerates all occurrences of the one or more second index terms in the document part of the documents of the collection. A text search query comprises one or more search conditions on one or more search terms, which are translated into one or more conditions on the one or more first index terms of the full posting index. The conditions of the one or more translated conditions, which are restricted to defined document parts, for which an additional posting index is available are identified. The one or more identified conditions with part restriction are rewritten as one or more pair conditions on the one or more second index terms of the additional posting index and the corresponding document part. The one or more pair conditions are processed using only the additional posting index.

Thus, various embodiments of the present invention can process restricted search conditions using only a corresponding additional posting index without accessing the full posting index and without accessing the field posting index. This significantly improves query efficiency for these kinds of queries.

A further object of the present invention is to provide a system for processing a text search query according to the method described above. The system comprises a full posting index for the documents of the collection. The full posting index comprises a first set of index terms and a full posting list for the index terms of the first set. The full posting index enumerates the occurrences of the index terms of the first set in the documents of the collection. The system also comprises search conditions on search terms of a given text search query that are translated into conditions on the index terms to provide one or more translated conditions. The system further comprises an additional posting index related to a defined document part and comprising a second set of index terms and a restricted posting list for the index terms of the second set. The restricted posting list enumerates the occurrences of the index terms of the second set in the document part of the documents of the collection. The system also comprises one or more identified conditions which are identified from the one or more translated conditions, which are restricted to defined document parts, for which an additional posting index is available. In the system, the identified conditions with part restriction are rewritten as pair conditions on the index terms of the second set of the additional posting index and the corresponding document part. A query result is based on the additional posting index and the pair conditions.

In various embodiments, a computer program product is stored on a computer usable medium, comprising computer readable program means for causing a computer to perform a method of processing a text search query in a collection of documents. The documents of the collection are associated with a full posting index. The full posting index comprises one or more first index terms and a full posting list. The full posting list enumerates occurrences of one or more first index terms in the documents of the collection. A text search query comprises one or more search conditions on one or more search terms. The one or more search conditions are translated into one or more conditions on the one or more first index terms to provide one or more translated conditions. At least one additional posting index is generated. The additional posting index is related to a defined document part and comprises one or more second index terms and a restricted posting list for the one or more second index terms, enumerating occurrences of the one or more second index terms in the document part of the documents of the collection. One or more conditions of the one or more translated conditions for which an additional posting index is available are identified to provide one or more identified conditions. The one or more identified conditions are rewritten as one or more pair conditions on the one or more second index terms of the additional posting index and corresponding document part. The one or more pair conditions are processed using the additional posting index to provide a query result.

BRIEF DESCRIPTION OF THE DRAWINGS

The novel features of the present invention are set forth in the appended claims. These features, additional objectives and advantages of the present invention as well as preferred modes of use will be apparent and best understood by reference to the following detailed description of illustrative embodiments, when read in conjunction with the accompanying drawings, in which:

FIG. 1 depicts an example of a collection of documents together with a full posting index for this collection of documents and a field posting index;

FIG. 2 depicts three additional posting indexes generated in accordance with an embodiment of the invention for the example of FIG. 1;

DETAILED DESCRIPTION

Figure 3:
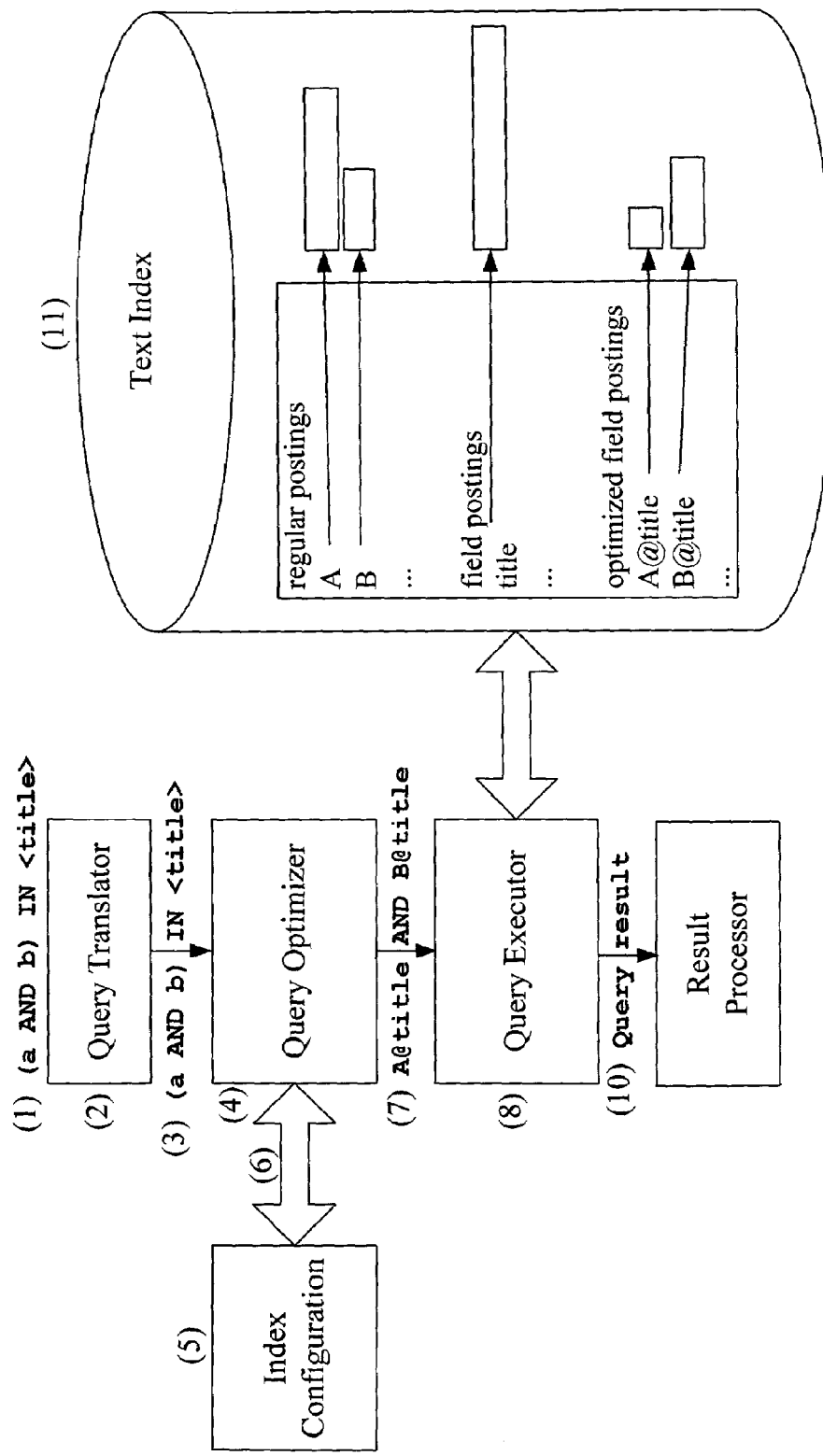
FIG. 3 depicts components of a system for processing a text search query in accordance with an embodiment of the present invention.

According to an embodiment of the present invention, a method is provided for processing text search queries in a collection of documents. A full posting index is generated and stored, and updated for each document added to the collection. The full posting index comprises a set of index terms and a full posting list for each index term of the set. In various embodiments, the full posting list enumerates the occurrences of one or more index terms in one or more documents of the collection. In some embodiments, the full posting list enumerates all occurrences of the index terms in all documents of the collection. In addition to the full posting index, at least one additional posting index is generated and stored, and updated for each document added to the collection. The additional posting index is related to a defined document part and comprises a set of index terms and a restricted posting list for each index term of the set. In various embodiments, the restricted posting list enumerates the occurrences of one or more index terms in one or more document parts of one or more documents of the collection. In some embodiments, the restricted posting list enumerates all occurrences of the index terms in the document part of all documents of the collection. A text search query comprises search conditions on search terms, which are translated into conditions on the index terms of the full posting index. The resultant translated conditions of a given text search query are optimized by identifying all conditions of the translated conditions, which are restricted to defined document parts, for which an additional posting index is available, and by rewriting the identified conditions with part restriction as pair conditions on index terms of the additional posting index and the corresponding document part. Then, the pair conditions can be processed using only the additional posting index.

Thus, various embodiments of the present invention can process restricted search conditions using only a corresponding additional posting index without accessing the full posting index and without accessing the field posting index. This significantly improves query efficiency for these kinds of queries.

One factor dominating query runtime is reading the corresponding index posting lists from disk. As proposed by various embodiments of the invention, it is highly advantageous to use an additional posting index, which is typically much smaller than the full posting index. Thus, reading the additional posting index from disk is significantly faster than reading the full posting index because less data has to be transferred in I/O operations. Another factor dominating query runtime is finding the next possible match in a posting list. For example, if "a" was found in document 2576, then the search engine should skip to the posting list of "b" to this document. A match is then indicated if document 2576 is mentioned in the posting list of "b"; otherwise, if that position does not exist, no match was found. In some embodiments, necessary for processing this next( ) operation is the decompression and decoding of the posting lists. Also, the processing of next( ) operations, as described above, is significantly easier when using an additional posting index according to various embodiments of the invention, because the additional posting index is smaller than the full posting index.

For many applications, the additional posting indexes, being related to defined document parts, will be based on the same set of index terms as the full posting index. However, it should be noted here, that an additional posting index may also be based on a set of index terms which is not identical to the set of index terms that the full posting index is based on. In some cases it might be advantageous to restrict the additional posting index to a smaller set of most significant index terms, whereas there might be other search conditions which can be processed more efficiently using an additional posting index with an extended set of index terms.

There exists a trade-off between the overall index size, that is, the size of the full posting index and all additional posting indexes, and the corresponding indexing runtime on one hand and query runtime on the other hand. The actual gains or losses on either side can be very different depending on the characteristics of the document part being related to an additional posting index and especially on the coverage of the document part. Using an additional posting index for a low-coverage document part is highly advantageous because on average this will result in huge query performance improvements for query conditions which are restricted to the document part at the cost of only minimally increasing index size and indexing runtime. For instance, using an additional posting index for the field "title" in a large document collection leads to an order of magnitude improvement in speed for queries searching mainly in the title of the documents. In contrast, it is less useful to generate an additional posting index for the field "body", because this is typically a field with high coverage. In addition, the search conditions of text search queries are rarely restricted to only the "body" field excluding other fields, such as the title, the abstract, etc.

According to various embodiments of the invention, an additional posting index can be generated for all kinds of document parts, which means for all kinds of subqueries defining document parts. An additional posting index is especially useful for processing field conditions, but can also be generated for processing phrases and proximity conditions. Keeping in mind that there exists a trade-off between the overall index size and query runtime, in some embodiments, additional posting indexes should be generated especially for sub-queries defining document parts with low coverage.

In some embodiments, another aspect to be considered when deciding upon generating an additional posting index for a specific document part, that is, optimizing on the document part, is how often it is used in queries. In various embodiments, it is advantageous to generate additional posting indexes especially for sub-queries which are frequently used.

In this context, it should be mentioned, that one major advantage of the approach proposed by various embodiments of the invention is the configurability of optimization, that is, the possibility of choosing document parts which are important in connection with a given query profile and generating additional posting indexes especially for those document parts. Therefore various embodiments of the method according to the invention are adaptable to different query profiles.

In some embodiments, another advantage is that the restricted posting lists of additional posting indexes are designed to enter the computation of more complex queries comprising a subquery of the given form, because they are stored in the same canonical order as the posting lists of the full posting index. That is, the posting lists of an additional posting index use the same sequence of document Ids as the posting lists of the full posting index. This canonical order is mandatory to enable fast intersection and union algorithms that are needed to realize AND and OR operations.

In various embodiments, another advantage of the invention concerns the estimation components for optimization purposes. In some embodiments, since all queries of the form "index term in document part" are pre-computed, if there exists an additional posting index for the document part, there are exact numbers of their result sizes, as well as very good estimates of their CPU processing and I/O costs. When queries of this form are encountered as subqueries in a larger query, the query optimizer, which is guided by those estimates, will be able to produce better access plans than in the non-optimized case, where these estimates are likely to contain errors.

An additional posting index can be generated for a defined document part by using the full posting index, which holds all information about the restricted posting lists to be computed for the index terms of the additional posting index.

In another advantageous embodiment of the present invention, when the additional posting index is related to a field, the additional posting index is generated and updated together with the generating and updating of the full posting index and a field posting index comprising a set of fields and a field posting list for each field of the set. The field posting list enumerates the start and end positions of the continuous parts of the field in all documents of the collection. In other words, in this case, an additional posting index can be generated during indexing, when all documents of the collection are scanned to obtain occurrence information for each index term and field information. The occurrence information will be added not only to the full posting index but also to all additional posting indexes which are concerned by using the field information, which is added to the field posting index.

In yet another advantageous embodiment of the present invention, additional posting indexes are used for ranking the resulting documents of a given text search query.

Commonly used ranking or scoring algorithms for text search take into account the frequency of an index term in a document or the weighted frequency, which means the frequency of the index term is weighted depending on the document part of its occurrence. In various embodiments, another important aspect for ranking is the overall number of occurrences of the index term in the collection, wherein very general terms are less significant. In some embodiments, this information has to be available for score computation.

Consider the ranking of resulting documents in an index that is built only over a certain field of a document collection, for example, the title field. As described above, the ranking commonly depends on the term frequency and document frequency values of the term and the document to be ranked in the given index. These values may be significantly different when only the title part of a document is considered.

Therefore, various embodiments of the present invention propose to enhance the restricted posting lists of an additional posting index by adding ranking information about the weighted and/or unweighted index term frequency in each document, for example, a term salience value which represents a generalization of term frequency that takes other factors into account which provide evidence of the salience of the index term in a given document as a whole. In these embodiments, this ranking information is extracted from the full posting index at indexing time.

In some embodiments, a system for processing a text search query according to the method described above, is provided. The system comprises means for generating and storing a full posting index, and updating the full posting index for each document added to the collection. The full posting index comprises a set of index terms and a full posting list for each index term of the set. The full posting list enumerates all occurrences of the index term in all documents of the collection. In addition, there are means for generating and storing an additional posting index, and updating the additional posting index for each document added to the collection. The additional posting index is related to a defined document part and comprises a set of index terms and a restricted posting list for each index term of the set. The restricted posting list enumerates all occurrences of the index term in the document part of all documents of the collection. The system further comprises means for translating the search conditions on search terms of a given text search query into conditions on the index terms of the full posting index and means for optimizing the translated conditions of a given text search query by identifying all conditions of the translated conditions, which are restricted to defined document parts, for which an additional posting index is available, and by re-writing the identified conditions with part restriction as pair conditions on index terms of the additional posting index and the corresponding document part. An executor uses the additional posting index to process the pair conditions.

In another advantageous embodiment of the present invention, the system further comprises means for generating and storing a field posting index, and updating the field posting index for each document added to the collection. The field posting index comprises a set of fields and a field posting list for each field of the set. The field posting list enumerates the start and end positions of the continuous parts of the field in all documents of the collection.

In yet another embodiment of the present invention, the system also comprises estimation components for optimization purposes which allows the query result size, query processing CPU time and query processing I/O time to be estimated based on statistical information extracted from the full posting index and the additional posting index.

FIG. 1 depicts an example of a collection of documents 100 together with a full posting index 200 for this collection of documents 100 and a field posting index 300. As already described in connection with the description of the related art, the collection of documents 100 comprises three text documents doc1, doc2 and doc3, containing the search terms a, b, c and d. The full posting index 200 is based on these search terms, a, b, c and d, and comprises a full posting list for each of these search terms, a, b, c and d. The full posting lists enumerate all occurrences of the corresponding search term in all documents doc1, doc2 and doc3 of the collection 100. In addition, each document doc1, doc2 and doc3, has a "title" field, a "body" field and a discontinuous field "highlighted", comprising all highlighted terms of the document. Consequently, the field posting index 300 is based on the set of fields "title", "body" and "highlighted" and comprises a field posting list for each of the fields, enumerating the start and end positions of the continuous parts of the field in all documents of the collection 100.

According to various embodiments of the invention, additional posting indexes 400, 500 and 600 are generated as shown in FIG. 2. Similar to the full posting index 200, the additional posting indexes 400, 500 and 600 are inverted indexes and, thus, based on a set of index terms. In this example, the full posting index 200 and the additional posting indexes 400, 500 and 600 use the same set of index terms a, b, c and d. However, it should be mentioned here, that this is only one possible implementation of the present invention. Depending on the query profile, the additional posting indexes might be based on a smaller more significant set of index terms or even on a larger set of index terms than the full posting index. Each of the additional posting indexes 400, 500 and 600 is related to one of the fields "title", "body" or "highlighted", which is indicated by a corresponding pair "index term@field". Each of these pairs represents a reference to a restricted posting list enumerating all occurrences of the corresponding index term in the corresponding field of all documents of the collection 100.

According to the invention these additional posting indexes 400, 500 and 600 are used to process search conditions of a given text search query, which are restricted to the corresponding field. The additional posting indexes 400, 500 and 600 allow a response to those search conditions to be provided without accessing the full posting index 200 or the field posting index 300.

Since the search engine has to be able to process all kinds of queries, a full posting index is obligatory. In various embodiments, the overhead introduced by adding redundant additional posting indexes has to be set in relation to the improvement in query processing when using the additional posting indexes. A significant improvement in query processing can be observed by using additional posting indexes for sub-queries which are restricted to document parts with low coverage and for sub-queries which are frequently used.

Figure 4:
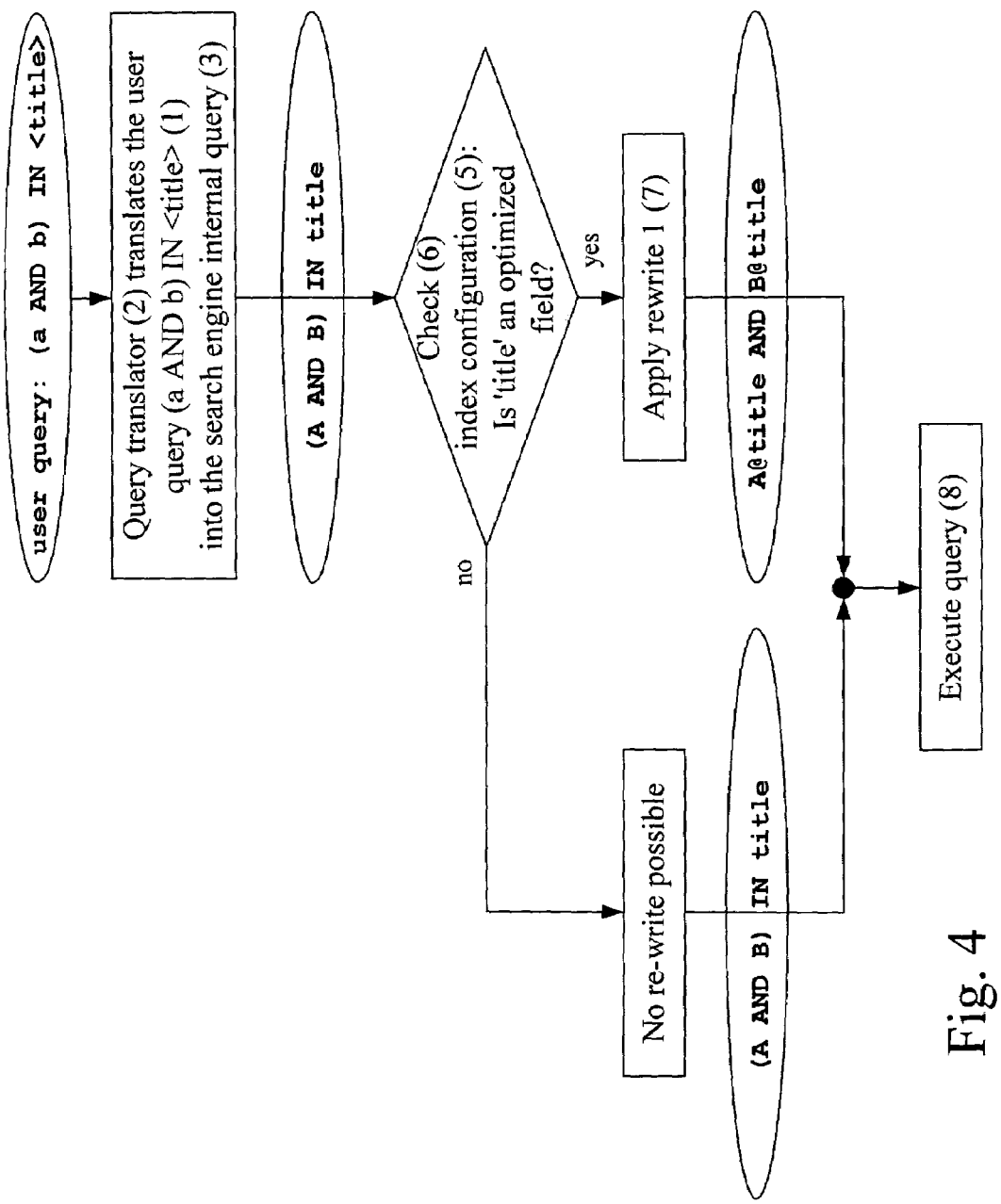
FIG. 4 depicts a flow chart of processing a text search query in accordance with an embodiment of the present invention.

As mentioned above, FIG. 3 depicts the components of an embodiment of a system, which in various embodiments are necessary, for processing a text search query according to some embodiments of the present invention. This diagram is related to FIG. 4, which depicts a flow chart for processing the text search query "(a AND b) IN <title>" to exemplify some aspects of various embodiments of the present invention.

In a first step 1, the text search query "(a AND b) IN <title>", which comes from a user, is translated by a query translator 2 into search engine internal conditions, also referred to as translated conditions 3. Therefore, the search terms, used by the user, are mapped to index terms of the full posting index, for example, by reducing words to their stems and by ignoring case information. In addition, explicit operators are introduced by translating the original search conditions. In this example, this results in the translated conditions 3 "(A AND B) IN title" which are transmitted to a query optimizer 4.

First, the query optimizer 4 checks the index configuration 5 in step 6. The index configuration 5 contains the information for which of all fields stored in the field posting index and additional posting index has been generated. These fields are referred to as optimized fields in the context of the present invention.

Only if "title" is an optimized field, that is, an additional posting index is available for the "title" field, can the query optimizer 4 re-write the translated conditions 3 as so-called pair conditions 7 on the index terms A and B and the "title" field. The resulting re-written conditions 7 are "A@title AND B@title".

In this case, a query executor 8 processes the re-written conditions 7 by using only the corresponding optimized field postings, that is, the corresponding additional posting index, which is stored together with the regular postings, that is, the full posting index, and the field postings, that is, the field posting index, in text index 11. The query result 10 is transmitted to a result processor.

If no additional posting index is available for the "title" field, it is not possible to re-write the translated conditions 3 according to the invention. Then, the translated conditions 3 have to be processed by using the regular postings, that is, the full posting index, and the field postings, that is, the field posting index.

In both cases, the access of the query executor 8 to text index 11 is indicated by arrow 9.

The foregoing example illustrates that the invention applies especially to text search queries in which a fast search on defined document parts becomes an issue. Therefore, various embodiments of the present invention proposes to maintain multiple posting structures, one for the whole documents and one for each document part, that should support a fast search. Consequently, the query executor is able to route queries to the respective index depending on which parts are to be searched.

Once again, it should be pointed out, that various embodiments of the method provided by the invention allow significant improvements in query efficiency in full text search engines when queries involve fields, by adding additional material to the overall index and exploiting this information during query processing. Various embodiments of the approach described herein allow query performance to be traded against increasing index size by allowing the selection of which fields to optimize. Thus, in many cases huge improvements in query performance can be achieved for queries which are restricted to fields with only minimum index size increase by selecting the most beneficial fields.

In various embodiments, a computer system processes a text search query. The system comprises a full posting index for the documents of the collection. The full posting index comprises a first set of index terms and a full posting list for the index terms of the first set. The full posting index enumerates the occurrences of the index terms of the first set in the documents of the collection. The system also comprises search conditions on search terms of a given text search query that are translated into conditions on the index terms to provide one or more translated conditions. The system further comprises an additional posting index related to a defined document part and comprising a second set of index terms and a restricted posting list for the index terms of the second set. The restricted posting list enumerates the occurrences of the index terms of the second set in the document part of the documents of the collection. The system also comprises one or more identified conditions which are identified from the one or more translated conditions, which are restricted to defined document parts, for which an additional posting index is available. In the system, identified conditions with part restriction are rewritten as pair conditions on the index terms of the second set of the additional posting index and the corresponding document part. A query result is based on the additional posting index and the pair conditions.

In various embodiments, the present invention may be implemented as a method, system, or article of manufacture using standard programming and/or engineering techniques to produce software, firmware, hardware, or any combination thereof. The term "computer program product" (or alternatively, "article of manufacture") as used herein is intended to encompass a computer program accessible from any computer-readable device, carrier or media. In addition, the software in which various embodiments are implemented may be accessible through a transmission medium, for example, from a server over a network. The computer program product in which the code is implemented also encompasses transmission media, such as a network transmission line and wireless transmission media. Thus the computer program product also comprises the medium in which the code is embedded. Those skilled in the art will recognize that many modifications may be made to this configuration without departing from the scope of the present invention.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A method of processing a text search query in a collection of documents,
   wherein a full posting index comprises one or more first index terms and a full posting list for each first index term, enumerating all occurrences of said one or more first index terms in said documents of said collection; and
   a text search query comprises one or more search conditions on one or more search terms, said one or more search conditions being translated into one or more conditions on said one or more first index terms to provide one or more translated conditions;
   said method comprising:
   generating at least one additional posting index, said additional posting index being related to a defined document part and comprising one or more second index terms and a restricted posting list for each second index term, enumerating occurrences of said one or more second index terms in said document part of said documents of said collection;
   identifying said one or more conditions of said translated conditions, which are restricted to defined document parts, for which an additional posting index is available to provide one or more identified conditions;
   re-writing said one or more identified conditions with part restriction as one or more pair conditions on said index terms of said additional posting index and corresponding document part; and
   processing said one or more pair conditions using said additional posting index to provide a query result.

2. The method according to claim 1 wherein said additional posting index is generated for subqueries defining document parts comprising at least one and any combination of a field condition, phrase and proximity condition.

3. The method according to claim 2 wherein said additional posting index is generated for sub-queries defining document parts with low coverage.

4. The method according to claim 2 wherein said additional posting index is generated for sub-queries which are frequently used.

5. The method according to claim 1 wherein said additional posting index is generated by using said full posting index to compute restricted posting lists for said second set of index terms.

6. The method according to claim 1,
   wherein a field posting index is generated, said field posting index comprising one or more fields and a field posting list for each field, enumerating start and end positions of continuous parts of said one or more fields in said documents of said collection;
   wherein said additional posting indexes are related to said one or more fields; and
   wherein said additional posting indexes are generated together with generating said full posting index and said field posting index.

7. The method according to claim 1 wherein said additional posting index comprises ranking information about a weighted and/or unweighted index term frequency in each document as a whole and wherein said ranking information is extracted from said full posting index.

* * * * *